United States Patent
Wentink

(10) Patent No.: US 9,179,476 B2
(45) Date of Patent: Nov. 3, 2015

(54) MULTI-USER TRANSMISSION DURING REVERSE DIRECTION GRANT

(71) Applicant: QUALCOMM Incorporated, San Diego, CA (US)

(72) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 13/648,873

(22) Filed: Oct. 10, 2012

(65) Prior Publication Data

US 2013/0089047 A1    Apr. 11, 2013

Related U.S. Application Data

(60) Provisional application No. 61/545,799, filed on Oct. 11, 2011.

(51) Int. Cl.
*H04W 74/06*    (2009.01)

(52) U.S. Cl.
CPC .................. *H04W 74/06* (2013.01)

(58) Field of Classification Search
USPC ......... 370/235, 236, 252, 310, 328, 329, 336, 370/338, 345, 395.4, 447, 458, 468, 474; 455/450, 454
See application file for complete search history.

(56) References Cited

U.S. PATENT DOCUMENTS

| | | | |
|---|---|---|---|
| 7,599,340 B2 * | 10/2009 | Chandra et al. ............... 370/338 |
| 7,974,250 B2 | 7/2011 | Jang et al. | |
| 7,986,676 B2 | 7/2011 | Waxman | |
| 8,630,680 B2 * | 1/2014 | Frederiks et al. .......... 455/552.1 |
| 2006/0092871 A1 * | 5/2006 | Nishibayashi ........ H04L 1/1671 370/328 |
| 2006/0165036 A1 * | 7/2006 | Chandra et al. ............... 370/329 |
| 2007/0058605 A1 * | 3/2007 | Meylan ............. H04W 72/0406 370/346 |
| 2007/0147284 A1 | 6/2007 | Sammour et al. | |
| 2007/0237169 A1 * | 10/2007 | Trainin et al. .................. 370/458 |
| 2007/0248117 A1 * | 10/2007 | Zuniga .................. H04W 74/06 370/468 |
| 2008/0002615 A1 * | 1/2008 | Nakajima et al. ............. 370/328 |
| 2009/0252110 A1 * | 10/2009 | Sridhara et al. ............... 370/330 |
| 2010/0182990 A1 | 7/2010 | Trainin et al. | |
| 2011/0013612 A1 | 1/2011 | Thoukydides | |
| 2011/0222408 A1 | 9/2011 | Kasslin et al. | |

OTHER PUBLICATIONS

International Search Report and Written Opinion—PCT/US2012/059791—ISA/EPO—Jan. 30, 2013.

* cited by examiner

*Primary Examiner* — Benjamin H Elliott, IV
*Assistant Examiner* — Eric Nowlin
(74) *Attorney, Agent, or Firm* — Dang M. Vo

(57) ABSTRACT

Certain aspects of the present disclosure provide methods and apparatus for multiuser transmission during a grant to utilize unused portion of a transmit opportunity (TXOP) that is assigned to an initiator device. A responder device may receive, from an initiator device, at least one grant to utilize unused portion of the TXOP. In response to the grant and during the unused portion of the TXOP, The responder device may transmit a first message intended for the to the initiator device, and one or more messages intended for one or more other stations using multi-user transmission schemes. The messages transmitted to stations other than the initiator device may include an indication that the station does not need to respond (e.g., with an acknowledgment) upon receipt of the message.

26 Claims, 9 Drawing Sheets

MULTI-USER TRANSMISSION DURING REVERSE DIRECTION GRANT

CLAIM OF PRIORITY UNDER 35 U.S.C. §119

The present Application for Patent claims benefit of U.S. Provisional Patent Application Ser. No. 61/545,799, entitled, "Multi-User Transmission During Reverse Direction Grant," filed Oct. 11, 2011, and assigned to the assignee hereof and hereby expressly incorporated by reference herein.

TECHNICAL FIELD

Certain aspects of the present disclosure generally relate to wireless communications and, more particularly, multi-user transmission during reverse direction grant (RDG).

BACKGROUND

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation of communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

The IEEE 802.11 (REVmb) standard defines a Reverse Direction Grant (RDG) mechanism, which allows a station to grant time to a responding station to send data frames. The regular media access control (MAC) protocol (without RDG) may only allow transmission of an acknowledgment message after short inter-frame space (SIFS). The RDG protocol extends the regular MAC protocol to allow data transmission in addition to the acknowledgment transmission after SIFS.

As defined in the IEEE 802.11 standard, data transmissions during an RDG are restricted to frames that are addressed to the station that granted the RDG (e.g., the RDG initiator). This 'single user' limitation may preclude a station from sending data frames to multiple stations simultaneously, or sending data frames to the stations that are not the RDG initiator.

SUMMARY

Certain aspects of the present disclosure provide an apparatus for wireless communications. The apparatus generally includes a receiver configured to receive, from a first device, at least one grant to utilize unused portion of a transmit opportunity (TXOP) that is assigned to the first device, and a transmitter configured to transmit in response to the grant and during the unused portion of the TXOP, at least one first message intended for the first device and at least one second message intended for a second device, wherein the second message comprises an indication that the second device does not need to respond upon receipt of the second message.

Certain aspects of the present disclosure provide a method for wireless communications. The method generally includes receiving, from a first device, at least one grant to utilize unused portion of a transmit opportunity (TXOP) that is assigned to the first device, and transmitting in response to the grant and during the unused portion of the TXOP, at least one first message intended for the first device and at least one second message intended for a second device, wherein the second message comprises an indication that the second device does not need to respond upon receipt of the second message.

Certain aspects of the present disclosure provide an apparatus for wireless communications. The apparatus generally includes means for receiving, from a first device, at least one grant to utilize unused portion of a transmit opportunity (TXOP) that is assigned to the first device, and means for transmitting in response to the grant and during the unused portion of the TXOP, at least one first message intended for the first device and at least one second message intended for a second device, wherein the second message comprises an indication that the second device does not need to respond upon receipt of the second message.

Certain aspects of the present disclosure provide a computer-program product for wireless communications. The computer-program product typically includes a non-transitory computer-readable medium having instructions executable for receiving, from a first device, at least one grant to utilize unused portion of a transmit opportunity (TXOP) that is assigned to the first device, and transmitting in response to the grant and during the unused portion of the TXOP, at least one first message intended for the first device and at least one second message intended for a second device, wherein the second message comprises an indication that the second device does not need to respond upon receipt of the second message.

Certain aspects provide a station for wireless communications. The station generally includes at least one antenna, a receiver configured to receive, via the at least one antenna, from a first device, at least one grant to utilize unused portion of a transmit opportunity (TXOP) that is assigned to the first device, and a transmitter configured to transmit, in response to the grant and during the unused portion of the TXOP, at least one first message intended for the first device and at least one second message intended for a second device, wherein the second message comprises an indication that the second device does not need to respond upon receipt of the second message.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
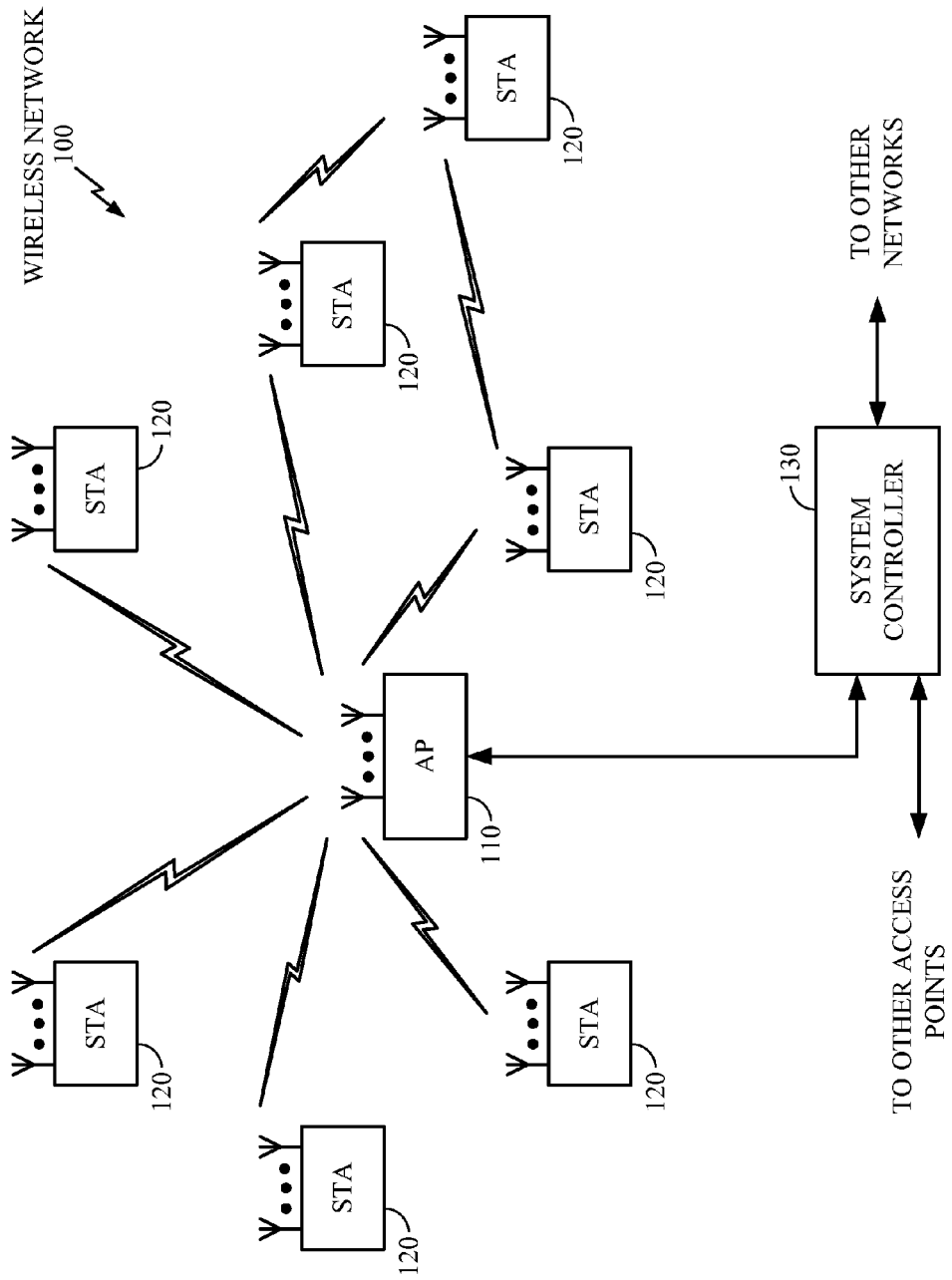
FIG. 1 shows a spatial division multiple access (SDMA) MIMO wireless system, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as Node B, Radio Network Controller ("RNC"), eNode B, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Several aspects of a wireless network will now be presented with reference to FIG. 1. The wireless network 100, which is also referred to herein as a basic service set (BSS), is shown with several wireless nodes, generally designated as an access point 110 and a plurality of access terminals 120 or stations (STAs). Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, a wireless node, an access terminal acting as an access point, or some other suitable terminology. An access terminal may be referred to as a user terminal (UT), a mobile station (MS), a subscriber station, a station (STA), a wireless device, a terminal, a node, a wireless node or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using Spatial Division Multiple Access (SDMA). SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream. It should be noted that although the term "precoding" is used herein, in general, the term "coding" may also be used to encompass the process of precoding, encoding, decoding and/or postcoding a data stream.

One or more access terminals 120 may be equipped with multiple antennas to enable certain functionality. With this configuration, for example, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

Figure 2:
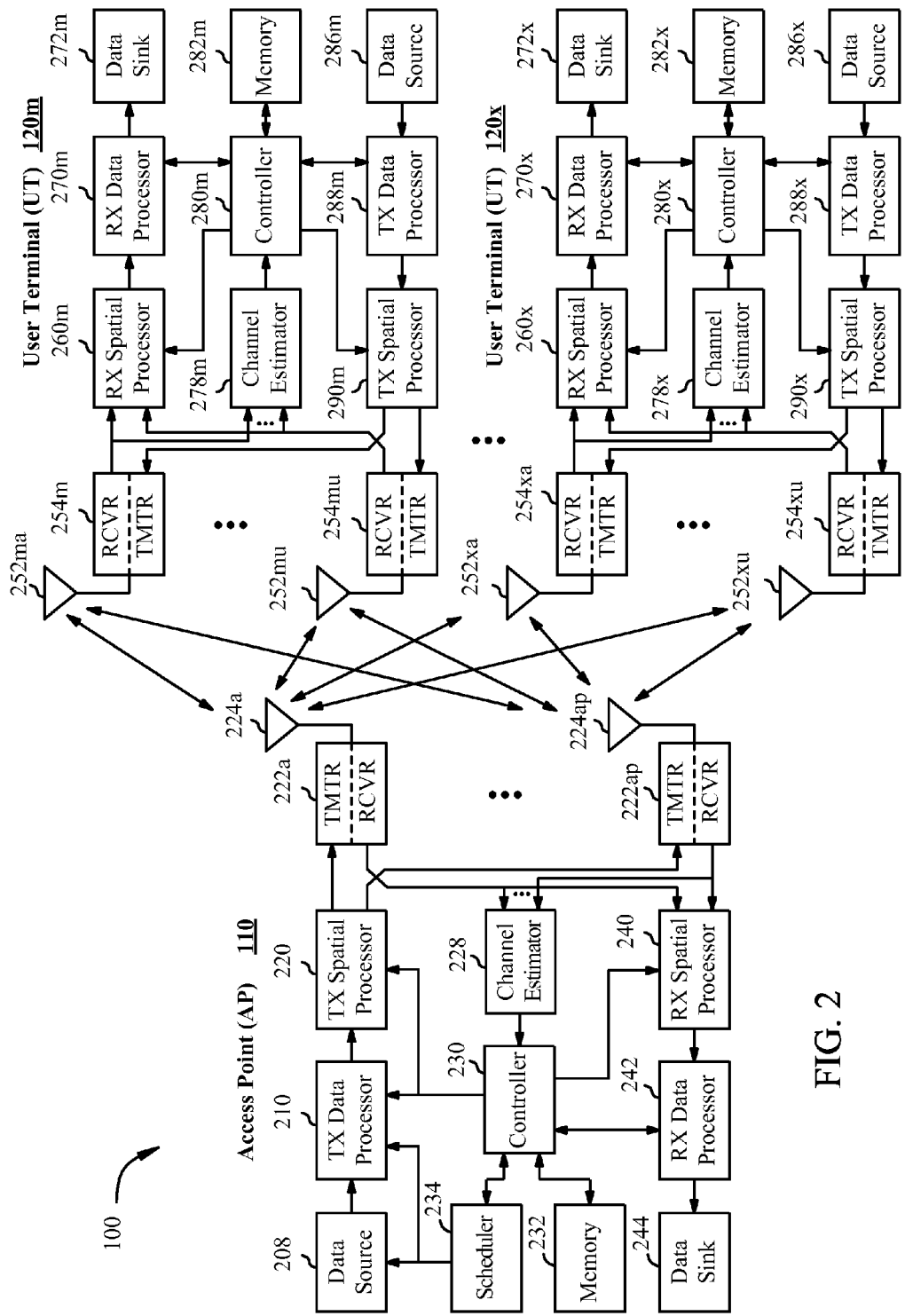
FIG. 2 illustrates a block diagram of an example access point and user terminals, in accordance with certain aspects of the present disclosure.

FIG. 2 illustrates a block diagram of access point 110 and two access terminals 120m and 120x in the wireless network 100, which may comprise a MIMO system. The access point 110 is equipped with $N_t$ antennas 224a through 224t. Access terminal 120m is equipped with $N_{ut,m}$ antennas 252ma through 252mu, and access terminal 120x is equipped with $N_{ut,x}$ antennas 252xa through 252xu. The access point 110 is a transmitting entity for the downlink and a receiving entity for the uplink. Each access terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each access terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal An RX data processor 242 processes (e.g., demodulates, de-interleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each access terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each access terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and access terminal 120, respectively.

As used herein, the term "legacy" generally refers to wireless network nodes that support 802.11n or earlier versions of the 802.11 standard. While certain techniques are described herein with reference to SDMA, those skilled in the art will recognize the techniques may be generally applied in systems utilizing any type of multiple access schemes, such as SDMA, OFDMA, CDMA, and combinations thereof.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

Figure 3:
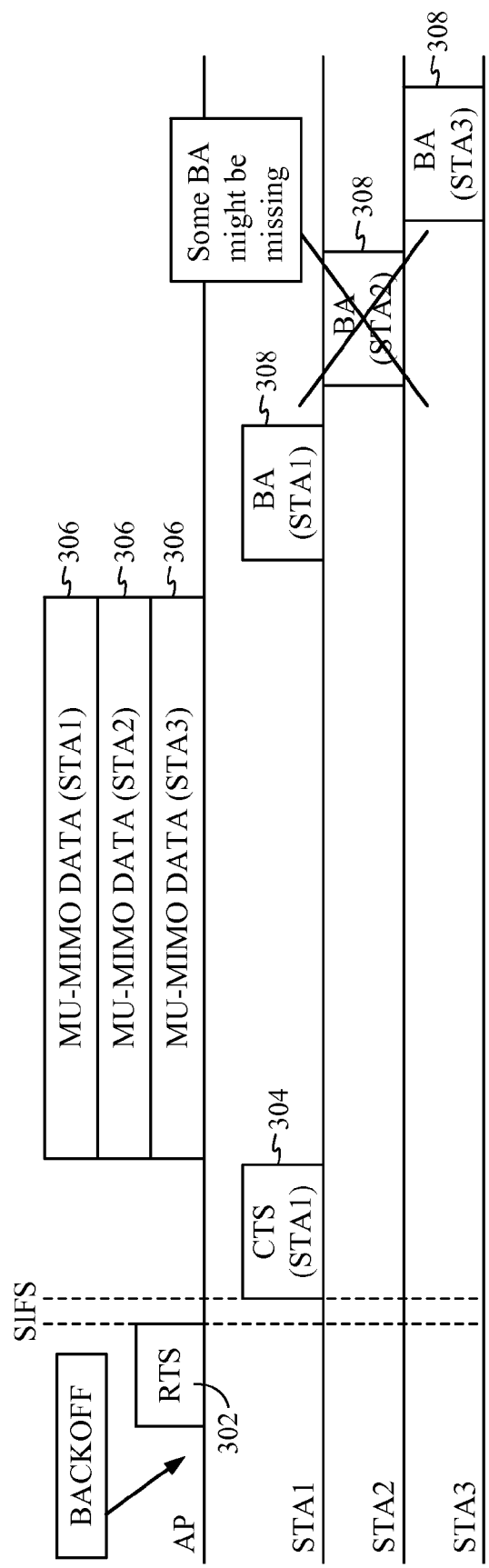
FIG. 3 illustrates an example downlink multiuser multiple-input multiple-output (DL-MU-MIMO) protocol, in accordance with certain aspects of the present disclosure.

FIG. 3 illustrates an example downlink multiuser multiple-input multiple-output (DL-MU-MIMO) between an access point and a plurality of stations, in accordance with certain aspects of the present disclosure. To begin, the AP may transmit a Request to Send (RTS) message 302 to one of the STAs (e.g., STA1) selected to receive the DL-MU-MIMO transmission. All data in the MU-MIMO aggregate may be of the same priority class. The RTS message 302 may be sent using contention parameters of a data class in the MU-MIMO aggregate.

Upon receiving the RTS message 302, the selected station (e.g., STA1) may transmit a Clear to Send (CTS) message 304 to the AP. The RTS message 302 and the CTS message 304 may be separated by a short inter-frame space (SIFS), a small interval between a data frame or other message and its acknowledgment (ACK). In response to receiving the CTS message 304, the AP may send DL-MU-MIMO data 306 to STAs selected by the scheduler (typically part of the processing system of the AP, such as scheduler 234 in FIG. 2). The STAs receiving the MU-MIMO data 306 may transmit BAs 308 in the uplink (UL) in series, starting with the BA for STA1 and ending with the BA for STA3 as shown in FIG. 3. The BA transmissions from the stations may be separated by SIFS. The order and timing for the BA transmissions by the stations may be sent in the DL-MU-MIMO data 306.

In DL-MU-MIMO transmissions, multiple packets are sent at the same time toward different STAs. If all the acknowledgments (ACKs) are received, the transmission may be considered successful. If no ACK is received, all the packets presumably failed, and this event may reasonably be interpreted as a collision. If only some of the ACKs are missing, while others are received, then the meaning of this event (e.g., whether this was a collision or a collision for only some of the STAs) and the appropriate reaction in terms of increasing the contention window (CW) may be defined. For example, in FIGS. 1 and 3, MU-MIMO data 306 was sent to STA1, STA2, and STA3 (access terminals 120), and a BA was subsequently received from each of STA1 and STA3, but not from STA2.

Conventional fully scheduled time division wireless communication systems may be associated with wasteful utilization of a communication channel. For instance, a particular station may be permitted to transmit data during a particular time period over a communication channel. However, when the station completes a transmission prior to the end of the allocated period, resources associated with the channel may be wasted since disparate stations are typically not enabled to access the channel to transmit data during this period. Reverse direction grants (RDGs) in association with scheduled channel access periods may be used to mitigate communication channel waste. The reverse direction grant may be utilized by the responding station to access the channel during the remainder of the allocated period.

Example Multi-User Transmission during Reverse Direction Grant

Certain aspects of the present disclosure present techniques for multi-user transmission during Reverse Direction grant (RDG). The proposed techniques allow a station (e.g., RDG responder) to transmit a multi-user transmission to one or more stations (e.g., that may or may not include the RDG initiator). In addition, techniques are presented for single user communication between the RDG responder and another station (e.g., other than the RDG initiator) during the time granted for reverse direction transmissions.

The IEEE 802.11 (REVmb) standard defines the RDG protocol, which allows a station to grant time (e.g., unused portion of a transmit opportunity (TXOP)) to a responding station to send data frames. The purpose of the RDG protocol is to more efficiently transfer data between two devices during a TXOP (or remaining portion of the TXOP) by eliminating the need for either device to initiate a new data transfer. Before the RD protocol, each uni-directional data transfer required the initiating station to capture (and possibly reserve time on) a contention-based radio frequency (RF) medium. With RDG, once a transmitting station (e.g., RD initiator) has obtained a TXOP, it may grant permission to other stations to send information to it (e.g., RD initiator) during its TXOP.

Two roles may be defined in the RDG protocol: RD initiator and RD responder. The RD initiator (e.g., the station that initiates the RDG) may send permission to the RD responder using a RDG in the RDG/More PPDU field of the HT Control field in a medium access control (MAC) frame, in which PPDU stands for Physical Layer Convergence Protocol (PLCP) Protocol Data Unit. The RDG/More PPDU field is used by the RD initiator for granting permission (RDG) to the RD responder, and it is used by the RD responder to signal whether or not the RD responder is sending more frames immediately following the one just received (e.g., More PPDU).

During an RD exchange sequence, the RD initiator station may transmit PPDUs and obtain response PPDUs from a single station (e.g., RD responder). Support of the RD feature is an option for a high throughput (HT) station. It is optional in the sense that a TXOP holder may or may not generate a RD grant, and a station receiving a RD grant may or may not use the grant.

The regular media access control (MAC) protocol (without RDG) may only allow transmission of an acknowledgment (ACK) or a Block ACK after short inter-frame space (SIFS). The RDG protocol extends the regular MAC protocol to allow data transmission in addition to the acknowledgment transmission after SIFS.

Currently, data transmissions during an RDG may be restricted to frames that are addressed to the station that granted the RDG (e.g., the RDG initiator). This 'single user' limitation simplifies the RDG protocol by precluding data frames to be transmitted to multiple stations simultaneously. In addition, during RDG, data frames may not be transmitted to any station that is not the RDG initiator. One problem that may arise with the above single user limitation is that when a station (e.g., a third STA) other than the RDG initiator receives frames during an RDG, the station may send a response (e.g., an acknowledgment) after SIFS. If the third station is out of reach of the RDG initiator, the RDG initiator may not receive such response frames. Therefore, the RDG initiator may invoke an error recovery rule and transmit after PIFS. The error recovery may result in a collision with the acknowledgment transmitted by the third STA.

Certain aspects of the present disclosure provide methods for multiuser transmission during RDG by allowing a RDG responder (e.g., a station that has received a RDG from a RDG initiator) to transmit a protocol data unit (PDU) to an RDG initiator. In addition, the RDG responder may transmit one or more PDUs to one or more other stations using single user or multi-user transmission schemes. The PDUs transmitted to stations other than the RDG initiator may include an indication that the station should not respond (e.g., acknowledgment is not needed or may be sent at a later time) upon receipt of the PDU.

In other words, certain aspects allow RDG transmissions to stations other than the RDG initiator (e.g., a third station) during a RDG, but preclude that the third station sends a response after SIFS. For example, an acknowledgment policy (e.g., No ACK policy or the Block ACK policy) may be applied to the transmission that does not cause a SIFS response from the third station. Therefore, the acknowledgment policies (e.g., Normal ACK and Implicit Block ACK) that do cause a SIFS response from the third station may be disallowed during RDG transmissions to the stations other than the RDG initiator.

Figure 4:
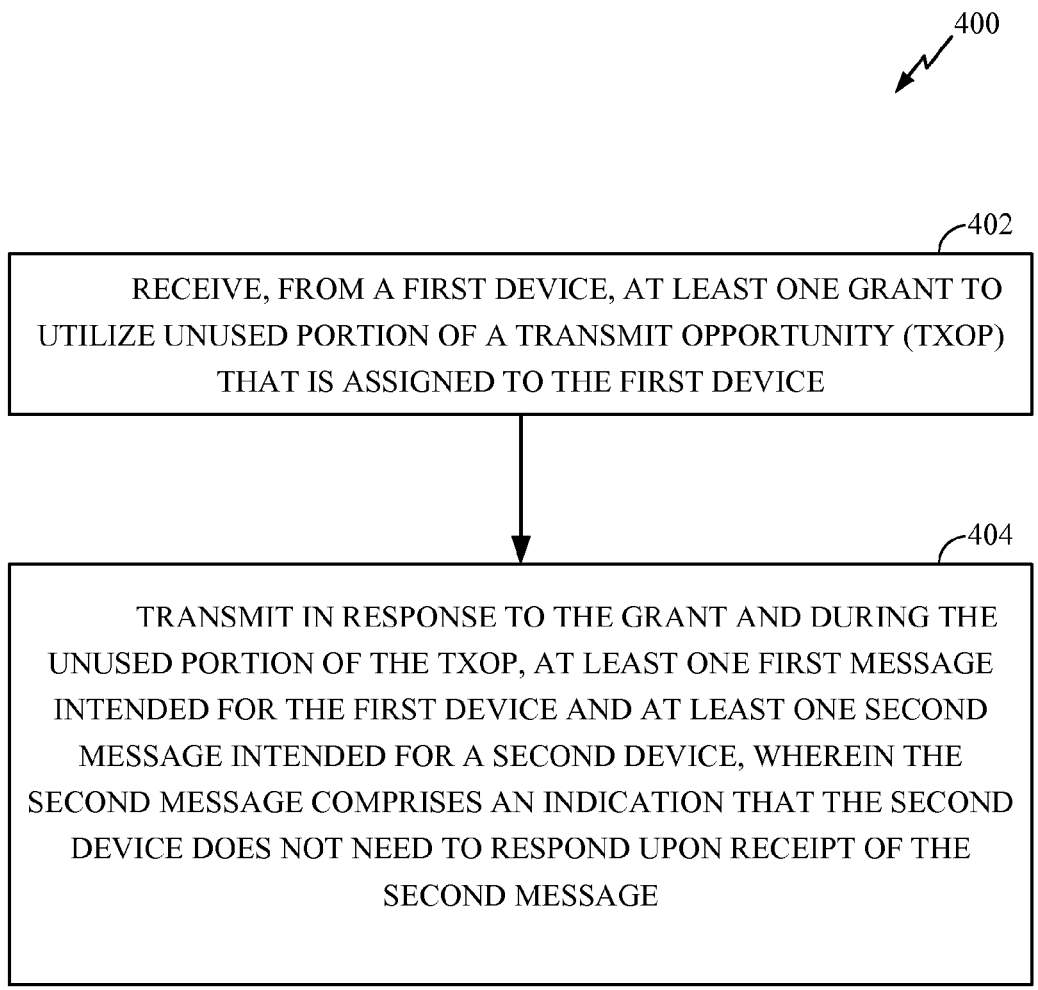
FIG. 4 illustrates example operations for multi-user transmission during a grant, in accordance with certain aspects of the present disclosure.

FIG. 4 illustrates example operations 400 for multi-user transmission during a grant, in accordance with certain aspects of the present disclosure. At 402, a station may receive, from a first device, at least one grant to utilize unused portion of a transmit opportunity (TXOP) that is assigned to the first device. The at least one grant may include one or more reverse direction grants (RDGs) received during the TXOP. The initiating station may also assign one or more RDGs in a single TXOP.

At 404, the station may transmit, in response to the grant and during the unused portion of the TXOP, at least one first message intended for the first device and at least one second message intended for a second device. For certain aspects, the first or the second message may be a protocol data unit (PDU). The second message may include an indication that the second device does not need to respond upon receipt of the second message. For example, the second message may include an acknowledgment policy that does not cause a SIFS response from the second device, such as No ACK policy or the Block ACK policy. In the No ACK policy, the receiving station is not required to acknowledge reception of the message (e.g., PDU). In the Block ACK policy, the station may store the acknowledgments for a plurality of received messages, and transmit them as a block of acknowledgments at a later time.

It should be noted that the station (e.g., the RDG initiator) may transmit messages (e.g., PDUs) to any number of stations during the TXOP. For example, the station may transmit a third message (e.g., third PDU) intended for a third device. The third PDU may also include an indication that the third device does not need to respond upon receipt of the third PDU. For certain aspects, the at least one grant may include a plurality of reverse direction grants (RDGs) received during the TXOP.

Figure 5:
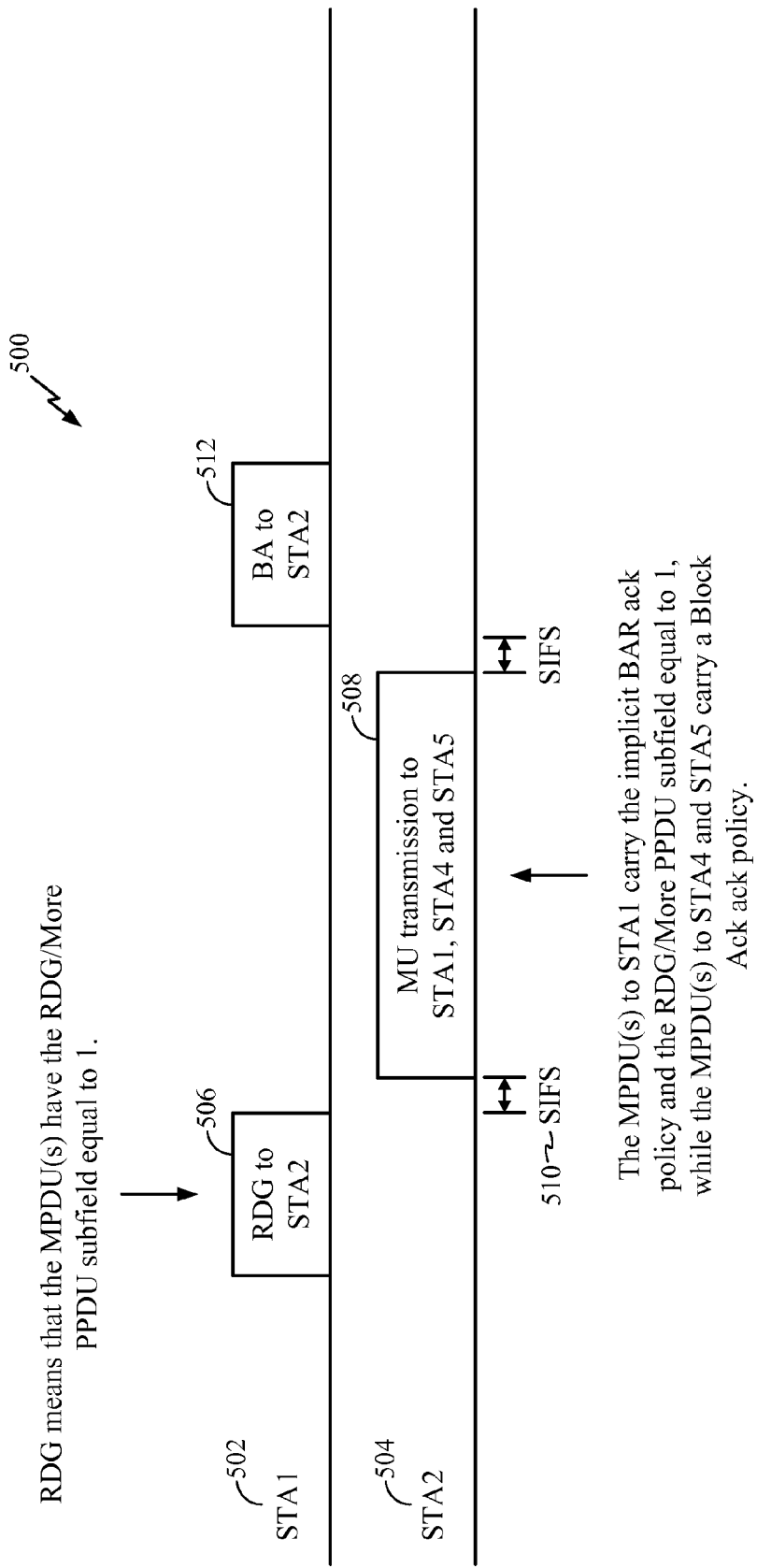
FIG. 5 illustrates an example multiuser transmission to a plurality of stations during a RDG, in accordance with certain aspects of the present disclosure.
Figure 6:
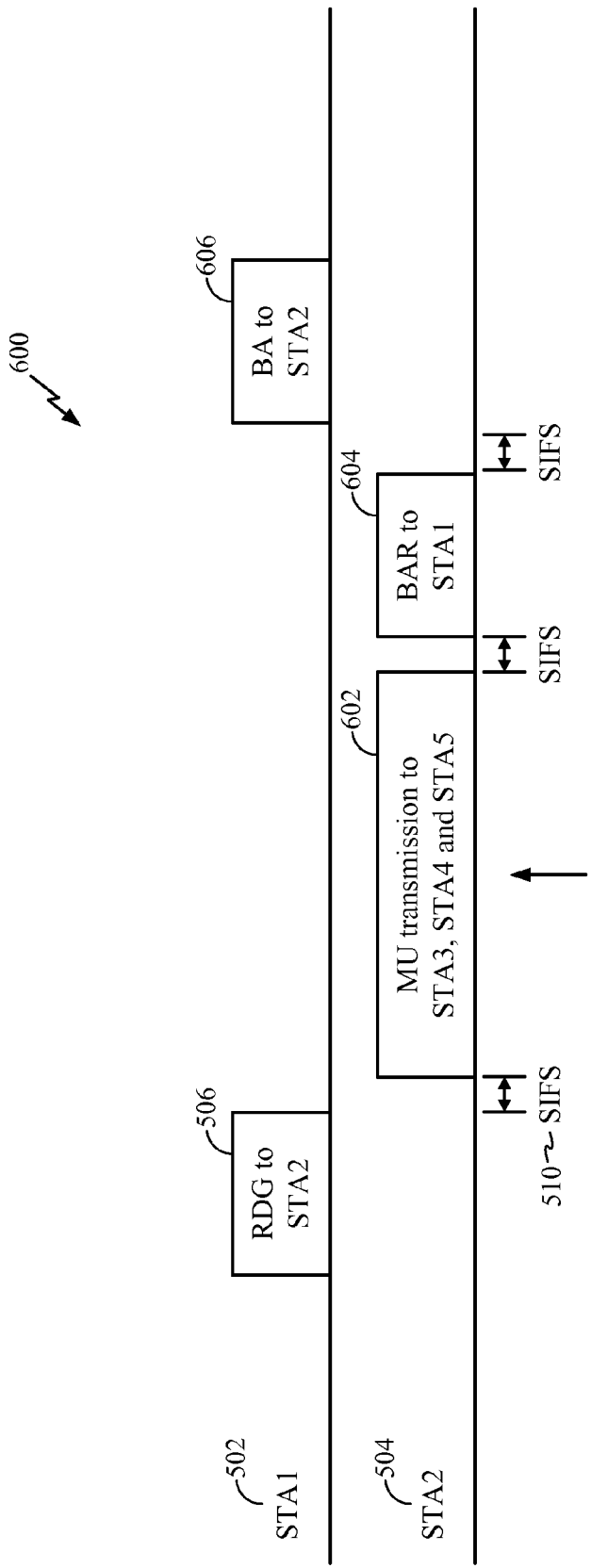
FIG. 6 illustrates a second example multiuser transmission to a plurality of stations during a RDG, in accordance with certain aspects of the present disclosure.
Figure 7:
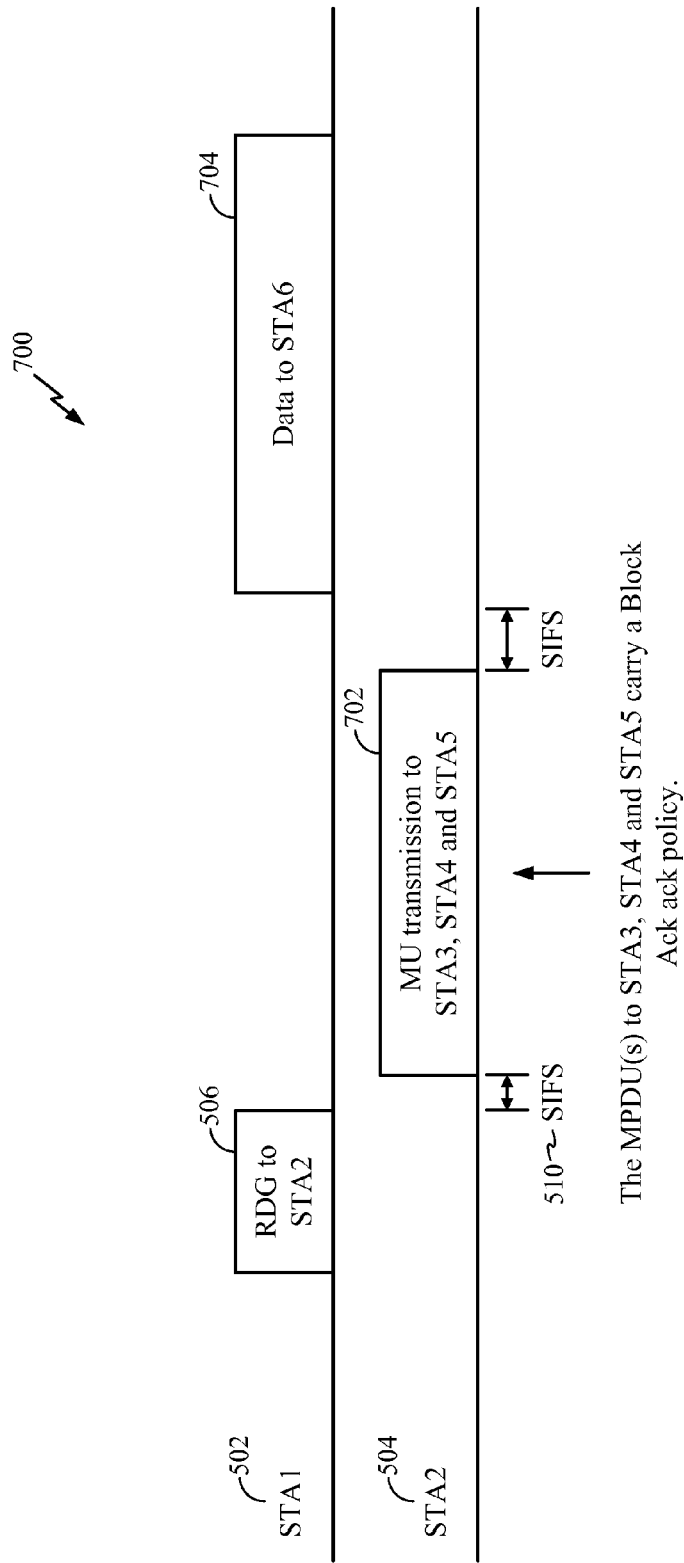
FIG. 7 illustrates a third example multiuser transmission to a plurality of stations during a RDG, in accordance with certain aspects of the present disclosure.

FIGS. 5 through 7 illustrate different example scenarios in which multi-user transmission to one or more stations may be employed by a RDG responder, in accordance with certain aspects of the present disclosure. FIG. 5 illustrates an example multiuser transmission 500 to a plurality of stations during a RDG, in which media access control PDUs (MPDUs) for an initiating station carry an implicit block acknowledgment request (BAR), while the MPDUs for other stations carry a block ACK policy, in accordance with certain aspects of the present disclosure. In this Figure, STA1 is the RDG initiator and STA2 is the RDG responder.

As illustrated, STA1 502 may send a message 506 (referred to herein as an RDG message) to STA2 504 to grant permission to utilize unused portion of its assigned TXOP. The RDG message may contain an RD grant (RDG). The RDG may be contained in one or more MPDUs in the RDG message. The RDG message 506 may include a physical layer protocol data unit (PPDU) containing one or more MPDUs that have one of their subfields (e.g., RDG/More PPDU subfield) set to one. After SIFS 510 duration is passed, the STA2 504 may send a multiuser transmission (MU) 508 to STA1 502 (e.g., the RDG initiator) and one or more other stations (e.g., STA4 and STA5, not shown). The MPDUs transmitted to STA1 in the multiuser transmission 508 may carry an implicit BAR, and their RDG/More PPDU subfield may be set to one.

The MPDUs that are transmitted to STA4 and STA5 may carry an acknowledgment policy that does not require a SIFS response (e.g., Block ACK or No ACK acknowledgment policies). After SIFS is passed, the STA1 may send a Block ACK (BA) 512 to STA2 504, but STA4 and STA5 may not send any acknowledgment messages immediately after SIFS. The stations other than the RDG initiator may send a Block Acknowledgment to STA2 at a later time, or may not send any acknowledgments to STA2 at all.

FIG. 6 illustrates another example multiuser transmission 600 to a plurality of stations during a RDG. As shown, MPDUs for the plurality of stations carry block acknowledgment policy and MPDUs for the RDG initiator carry a block acknowledgment request, in accordance with certain aspects of the present disclosure. Similar to FIG. 5, STA1 502 (the RDG initiator) may send a RDG message 506 to STA2 504. After SIFS 510 is passed, the STA2 504 (e.g., the RDG responder) may send one or more multi-user transmissions 602 to a plurality of stations (e.g., STA3, STA4 and STA5, not shown). The MPDUs that are transmitted to STA3, STA4 and STA5 in the multi-user transmission 602 may carry a Block ACK acknowledgment policy. STA2 504 may also send a block acknowledgment request (BAR) 604 to STA1 502. In response, STA1 (e.g., the RDG initiator) may send a Block ACK (BA) 606 to STA2 504.

FIG. 7 illustrates yet another example multiuser transmission 700 to a plurality of stations during a RDG, in accordance with certain aspects of the present disclosure. In this figure, the RDG responder may not have any data to send to the RDG initiator. Instead, the RDG responder may transmit data to a plurality of stations using the medium that is assigned to the RDG responder by the RDG initiator. As mentioned above, MPDUs for the plurality of stations may carry block acknowledgment policy. Similar to FIG. 6, the RDG initiator (STA1 502) may send a RDG message 506 to STA2 504. After SIFS 510 is passed, the STA2 504 may send a multiuser transmission 702 to a plurality of stations (e.g., STA3, STA4 and STA5, not shown) using the transmit opportunity that is assigned to RDG. The MPDUs that are transmitted to STA3, STA4 and STA5 in the multiuser transmission 702 may carry a Block ACK acknowledgment policy. In this example, STA2 does not send anything to STA1 in the RDG. After PIFS (point coordination inter-frame space) is passed, STA1 502 may send some data 704 to another station (e.g., STA6, not shown), or one of the plurality of the stations (e.g., STA3, STA4 or STA5).

Figure 8:
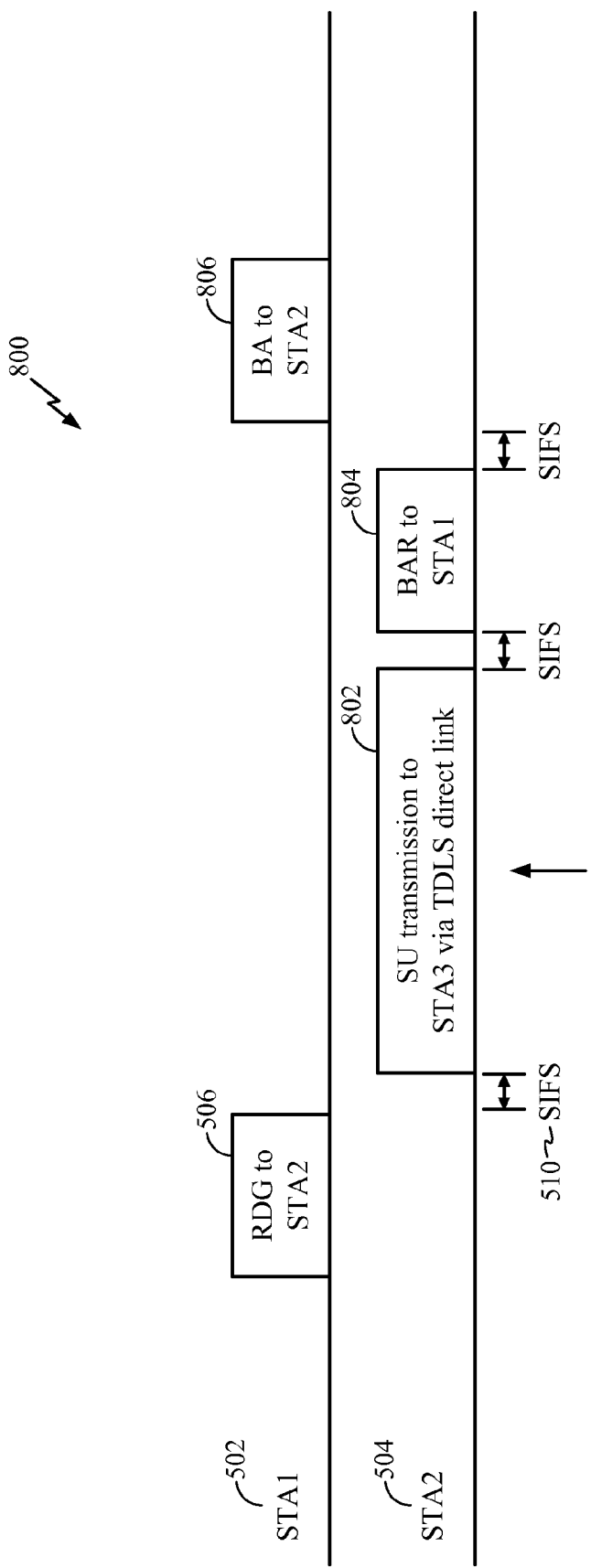
FIG. 8 illustrates an example single user transmission to a station other than a RDG initiator during a RDG, in which some of the stations are connected via a tunneled direct link setup (TDLS) link, in accordance with certain aspects of the present disclosure.

FIG. 8 illustrates an example single user transmission to a station other than a RDG initiator during a RDG, in accordance with certain aspects of the present disclosure. In this example, the RDG responder is connected to the station (e.g., STA3) via a tunneled direct link setup (TDLS) link. TDLS enables devices to intelligently negotiate between themselves and determine methods that will avoid or reduce network congestion. As illustrated, STA1 502 may send a RDG message 506 to STA2 504. After SIFS 510 is passed, if STA2 does not have anything to send to the RDG initiator, STA2 may use the TXOP to transmit data to another station (e.g., STA3). However, the transmissions from STA2 to STA3 may not elicit a response after SIFS to avoid collision. For example, STA2 504 may send a single user transmission 802 to STA3. The MPDUs that are transmitted to STA3 in the single-user (SU) transmission 802 may carry an acknowledgment policy that does not elicit a response after SIFS. STA2 504 and STA3 may be connected through a TDLS link. STA2 504 may also send a block acknowledgment request (BAR) 804 to STA1 502. In response, STA1 may send a Block ACK (BA) 806 to STA2 504.

As described herein, a station may transmit one or more PDUs to one or more stations other than the RDG initiator using a multi-user transmission scheme (e.g., as described with respect to FIGS. 5, 6 and 7), or transmit one or more PDUs to a station other than the RDG initiator, during a TXOP, using a single-user transmission scheme (e.g., as described with respect to FIG. 8). As described herein, the transmissions to stations other than the RDG initiator during an RDG may not elicit a response after SIFS (e.g., Block ACK and no ACK acknowledgment policies).

Figure 9:
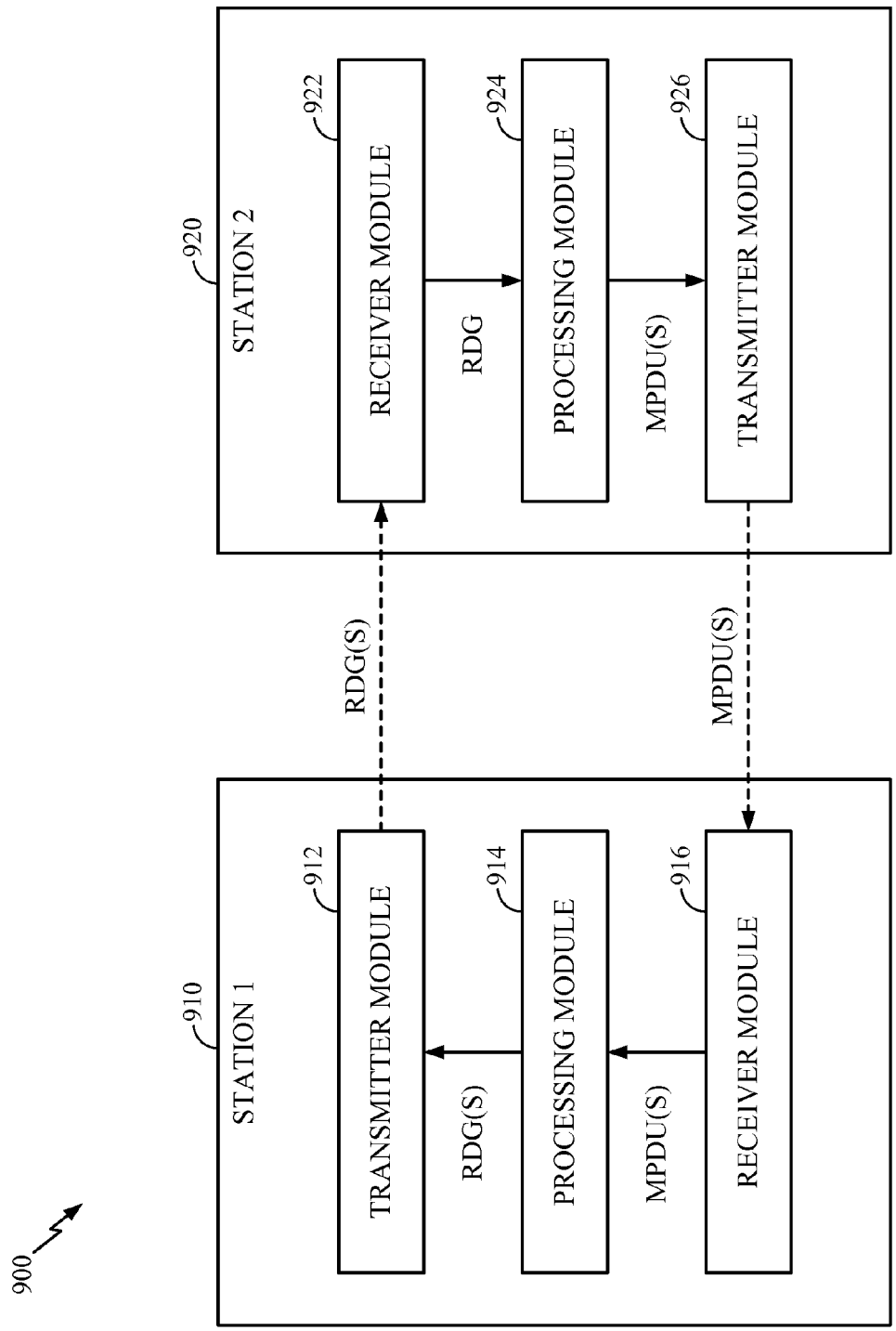
FIG. 9 illustrates example communications between two stations, in accordance with certain aspects of the present disclosure.

FIG. 9 illustrates example communications 900 between two stations, in accordance with certain aspects of the present disclosure. Station1 910 (e.g., a RDG initiator) assigns one or more RDGs to station2 920. Station1 transmits RDGs to station2 using the transmitter module 912. Station2 receives the RDGs using receiver module 922, and processes them using processing module 924. Station2 generates MPDUs to transmit to the station1 and one or more other stations (not shown). Station2 transmits the MPDUs using the transmitter module 926. Station1 receives the MPDUs using the receiver module 916 and processes the MPDUs using the processing module 914.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

For example, means for transmitting may comprise a transmitter (e.g., the transmitter unit 222) and/or an antenna 224 of the access point 110 or the transmitter unit 254 and/or an antenna 252 of the access terminal 120 illustrated in FIG. 2, and/or transmitter module 926 as illustrated in FIG. 9. Means for receiving may comprise a receiver (e.g., the receiver unit 254) and/or an antenna 252 of the access terminal 120 or the receiver unit 222 and/or an antenna 224 of the access point 110 illustrated in FIG. 2, and/or receiver module 916 as illustrated in FIG. 9.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "at least one of A or B" is meant to include any combination of A and B. In other words, "at least one of A or B" comprises A or B or A and B.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communications, comprising:
a receiver configured to receive, from a first device, a message comprising at least one grant, wherein the at least one grant grants the apparatus permission to use an unused portion of a transmit opportunity (TXOP) that is assigned to the first device; and
a transmitter configured to transmit, in response to the at least one grant and during the unused portion of the TXOP granted by the at least one grant, at least one first message intended for the first device and at least one second message intended for a second device, wherein the at least one second message comprises an indication that the second device does not need to respond upon receipt of the at least one second message.

2. The apparatus of claim 1, wherein the at least one first message and the at least one second message comprise an acknowledgment policy, wherein the acknowledgment policy of the at least one first message is different from the acknowledgment policy of the at least one second message, and wherein the acknowledgment policy of the at least one second message does not cause a response after a short inter-frame space (SIFS).

3. The apparatus of claim 2, wherein the acknowledgment policy of the at least one second message is a Block Acknowledgment (Block ACK) acknowledgment policy.

4. The apparatus of claim 1, wherein the transmission comprises one or more multi-user transmissions in the TXOP.

5. The apparatus of claim 1, wherein the message comprises a plurality of grants received during the TXOP.

6. The apparatus of claim 1, wherein the transmission further comprises a third message intended for a third device, wherein the third message comprises an indication that the third device does not need to respond upon receipt of the third message.

7. The apparatus of claim 1, wherein the at least one grant is a reverse direction grant (RDG), and the RDG is received in one or more media access control protocol data units (MPDUs) having RDG/More physical layer protocol data unit (PPDU) subfield bit set to a value that indicates existence of at least one of an RDG or a PPDU.

8. The apparatus of claim 1, wherein the at least one first message is a protocol data unit (PDU).

9. A method for wireless communications, comprising:
receiving, from a first device, a message comprising at least one grant, wherein the at least one grant grants permission to use an unused portion of a transmit opportunity (TXOP) that is assigned to the first device; and
transmitting, in response to the at least one grant and during the unused portion of the TXOP granted by the at least one grant, at least one first message intended for the first device and at least one second message intended for a second device, wherein the at least one second message comprises an indication that the second device does not need to respond upon receipt of the at least one second message.

10. The method of claim 9, wherein the at least one first message and the at least one second message comprise an acknowledgement policy, wherein the acknowledgement policy of the at least one first message is different from the acknowledgement policy of the at least one second message, and wherein the acknowledgement policy of the at least one second message does not cause a response after a short inter-frame space (SIFS).

11. The method of claim 10, wherein the acknowledgment policy of the at least one second message is a Block Acknowledgment (Block ACK) acknowledgment policy.

12. The method of claim 9, wherein the transmission comprises one or more multi-user transmissions in the TXOP.

13. The method of claim 9, wherein the message comprises a plurality of grants received during the TXOP.

14. The method of claim 9, wherein the transmission further comprises a third message intended for a third device, wherein the third message comprises an indication that the third device does not need to respond upon receipt of the third message.

15. The method of claim 9, wherein the at least one grant is a reverse direction grant (RDG), and the RDG is received in one or more media access control protocol data units (MPDUs) having RDG/More physical layer protocol data unit (PPDU) subfield bit set to a value that indicates existence of at least one of an RDG or a PPDU.

16. The method of claim 9, wherein the at least one first message is a protocol data unit (PDU).

17. An apparatus for wireless communications, comprising:
means for receiving, from a first device, a message comprising at least one grant, wherein the at least one grant grants the apparatus permission to use an unused portion of a transmit opportunity (TXOP) that is assigned to the first device; and
means for transmitting, in response to the at least one grant and during the unused portion of the TXOP granted by the at least one grant, at least one first message intended for the first device and at least one second message intended for a second device, wherein the at least one second message comprises an indication that the second device does not need to respond upon receipt of the at least one second message.

18. The apparatus of claim 17, wherein the at least one first message and the at least one second message comprise an acknowledgment policy, wherein the acknowledgment policy of the at least one first message is different from the acknowledgment policy of the at least one second message, and wherein the acknowledgment policy of the at least one second message does not cause a response after a short inter-frame space (SIFS).

19. The apparatus of claim 18, wherein the acknowledgment policy of the at least one second message is a Block Acknowledgment (Block ACK) acknowledgment policy.

20. The apparatus of claim 17, wherein the means for transmitting is configured to perform one or more multi-user transmissions in the TXOP.

21. The apparatus of claim 17, wherein the message comprises a plurality of grants received during the TXOP.

22. The apparatus of claim 17, wherein the means for transmitting is further configured to transmit a third message intended for a third device, wherein the third message comprises an indication that the third device does not need to respond upon receipt of the third message.

23. The apparatus of claim 17, wherein the at least one grant is a reverse direction grant (RDG), and the RDG is received in one or more media access control protocol data units (MPDUs) having RDG/More physical layer protocol data unit (PPDU) subfield bit set to a value that indicates existence of at least one of an RDG or a PPDU.

24. The apparatus of claim 17, wherein the at least one first message is a protocol data unit (PDU).

25. A non-transitory computer-readable medium comprising instructions executable for:
receiving, from a first device, a message comprising at least one grant, wherein the at least one grant grants permission to use an unused portion of a transmit opportunity (TXOP) that is assigned to the first device; and
transmitting, in response to the at least one grant and during the unused portion of the TXOP granted by the at least one grant, at least one first message intended for the first device and at least one second message intended for a second device, wherein the at least one second message comprises an indication that the second device does not need to respond upon receipt of the at least one second message.

26. A station for wireless communications, comprising:
at least one antenna;
a receiver configured to receive, via the at least one antenna, from a first device, a message comprising at least one grant, wherein the at least one grant grants the station permission to use an unused portion of a transmit opportunity (TXOP) that is assigned to the first device; and a transmitter configured to transmit, in response to the at least one grant and during the unused portion of the TXOP granted by the at least one grant, at least one first message intended for the first device and at least one second message intended for a second device, wherein the at least one second message comprises an indication that the second device does not need to respond upon receipt of the at least one second message.

* * * * *